United States Patent
Kuo et al.

(10) Patent No.: US 12,054,922 B2
(45) Date of Patent: Aug. 6, 2024

(54) REFRIGERATOR INTEGRATED WITH AN ATMOSPHERIC WATER HARVESTING UNIT, AND METHODS OF USING THEREOF

(71) Applicant: Water Harvesting, Inc., Newark, CA (US)

(72) Inventors: David S. Kuo, Newark, CA (US); Bruno Marchon, Newark, CA (US); Ievgen Kapustin, Newark, CA (US)

(73) Assignee: Water Harvesting, Inc., Newark, CA (US)

( * ) Notice: Subject to any disclaimer, the term of this patent is extended or adjusted under 35 U.S.C. 154(b) by 246 days.

(21) Appl. No.: 17/763,413

(22) PCT Filed: Sep. 28, 2020

(86) PCT No.: PCT/US2020/053052
§ 371 (c)(1),
(2) Date: Mar. 24, 2022

(87) PCT Pub. No.: WO2021/067179
PCT Pub. Date: Apr. 8, 2021

(65) Prior Publication Data
US 2022/0389691 A1     Dec. 8, 2022

Related U.S. Application Data

(60) Provisional application No. 62/908,171, filed on Sep. 30, 2019.

(51) Int. Cl.
*E03B 3/28* (2006.01)
*F25D 23/12* (2006.01)
*F28F 13/18* (2006.01)

(52) U.S. Cl.
CPC .............. *E03B 3/28* (2013.01); *F25D 23/126* (2013.01); *F28F 13/187* (2013.01); *F25C 2400/10* (2013.01); *F25C 2400/14* (2013.01)

(58) Field of Classification Search
CPC .......... E03B 3/28; F25D 23/12; F25D 23/126; F28F 13/187; F25C 2400/10;
(Continued)

(56) References Cited

U.S. PATENT DOCUMENTS

| 1,559,762 A | 11/1925 | Newman |
| 4,180,985 A | 1/1980 | Northrup, Jr. |

(Continued)

FOREIGN PATENT DOCUMENTS

| CA | 3120865 | 7/2023 |
| CN | 102639540 A | 8/2012 |

(Continued)

OTHER PUBLICATIONS

Pdf is translation of foreign reference WO 2018230430 A1 (Year: 2018).*

(Continued)

*Primary Examiner* — Henry T Crenshaw
*Assistant Examiner* — Kamran Tavakoldavani
(74) *Attorney, Agent, or Firm* — Craig R. Miles; CR MILES P.C.

(57) ABSTRACT

Provided herein are refrigerator systems integrated with an atmospheric water harvesting unit, as well as methods using such systems. The atmospheric water harvesting unit serves as a water supply for the refrigerator system by capturing water from surrounding air. For example, the water capture materials may be metal organic frameworks. The systems and methods desorb this water in the form of water vapor, and the water vapor is condensed into liquid water and collected. The liquid water is suitable for use as drinking water.

15 Claims, 1 Drawing Sheet

(58) Field of Classification Search
CPC ...... F25C 2400/14; Y02A 20/00; F25B 25/02; F25B 2339/043; F25B 2339/045; F24F 3/1411; F24F 3/1417; F24F 3/1429
See application file for complete search history.

(56) References Cited

U.S. PATENT DOCUMENTS

| | | | |
|---|---|---|---|
| 4,304,577 A | 12/1981 | Ito et al. | |
| 4,646,541 A | 3/1987 | Reid et al. | |
| 5,565,139 A | 10/1996 | Walker et al. | |
| 5,632,802 A | 5/1997 | Grgich et al. | |
| 5,632,954 A | 5/1997 | Coellner et al. | |
| 6,684,648 B2 | 2/2004 | Faqih | |
| 8,627,673 B2 | 1/2014 | Hill et al. | |
| 9,134,038 B2 | 9/2015 | Lee et al. | |
| 9,446,969 B1 | 9/2016 | Redman et al. | |
| 10,266,737 B2 | 4/2019 | Van Horn et al. | |
| 10,695,741 B2 | 6/2020 | Motkuri et al. | |
| 10,829,913 B1 | 11/2020 | Ahmed et al. | |
| 10,857,855 B2 | 12/2020 | Tomita et al. | |
| 11,029,045 B2 | 6/2021 | Woods et al. | |
| 11,065,573 B2 | 7/2021 | Matuska et al. | |
| 11,679,339 B2 * | 6/2023 | Van de Mortel | B01D 5/0006 62/285 |
| 2004/0107832 A1 | 6/2004 | Tongue et al. | |
| 2004/0123615 A1 | 7/2004 | Yabu | |
| 2004/0123616 A1 | 7/2004 | Lee et al. | |
| 2004/0244398 A1 | 12/2004 | Radermacher et al. | |
| 2005/0044862 A1 | 3/2005 | Vetrovec et al. | |
| 2006/0130652 A1 | 6/2006 | Takewaki et al. | |
| 2007/0028769 A1 | 2/2007 | Eplee et al. | |
| 2009/0151368 A1 | 6/2009 | Bar | |
| 2009/0260385 A1 | 10/2009 | Hill et al. | |
| 2010/0126344 A1 | 5/2010 | Stein et al. | |
| 2011/0056220 A1 | 3/2011 | Caggiano | |
| 2011/0088552 A1 | 4/2011 | Ike et al. | |
| 2011/0296858 A1 | 12/2011 | Caggiano | |
| 2012/0172612 A1 | 7/2012 | Yaghi et al. | |
| 2013/0036913 A1 | 2/2013 | Fukudome | |
| 2013/0061752 A1 | 3/2013 | Farha et al. | |
| 2013/0192281 A1 | 8/2013 | Nam et al. | |
| 2013/0269522 A1 * | 10/2013 | DeValve | B01D 53/06 96/111 |
| 2013/0312451 A1 | 11/2013 | Max | |
| 2014/0138236 A1 | 5/2014 | White | |
| 2014/0165637 A1 | 6/2014 | Ma | |
| 2014/0287150 A1 | 9/2014 | Miljkovic et al. | |
| 2014/0326133 A1 | 11/2014 | Wang et al. | |
| 2014/0338425 A1 | 11/2014 | Kalbassi et al. | |
| 2016/0030858 A1 | 2/2016 | Giacomini | |
| 2016/0084541 A1 | 3/2016 | Aguado et al. | |
| 2016/0334145 A1 | 11/2016 | Pahwa et al. | |
| 2017/0008915 A1 | 1/2017 | Yaghi et al. | |
| 2017/0113184 A1 | 4/2017 | Eisenberger | |
| 2017/0129307 A1 | 5/2017 | Zhou et al. | |
| 2017/0211851 A1 | 7/2017 | Feng et al. | |
| 2017/0234576 A1 | 8/2017 | Kawagoe et al. | |
| 2017/0292737 A1 * | 10/2017 | Moon | F25D 23/126 |
| 2017/0354920 A1 | 12/2017 | Switzer et al. | |
| 2018/0043295 A1 | 2/2018 | Friesen et al. | |
| 2018/0171604 A1 | 6/2018 | Kim et al. | |
| 2018/0209123 A1 | 6/2018 | Bahrami et al. | |
| 2018/0261882 A1 | 9/2018 | Chang et al. | |
| 2019/0100903 A1 | 4/2019 | Panda et al. | |
| 2019/0234053 A1 | 8/2019 | Kim et al. | |
| 2019/0323714 A1 * | 10/2019 | Cui | F24F 3/14 |
| 2020/0009497 A1 | 1/2020 | Matuska et al. | |
| 2020/0206679 A1 | 7/2020 | Stuckenberg | |
| 2020/0283997 A1 | 9/2020 | Salloum et al. | |
| 2020/0316514 A1 | 10/2020 | Fuchs et al. | |
| 2020/0363078 A1 | 11/2020 | Mulet et al. | |
| 2021/0062478 A1 | 3/2021 | Friesen et al. | |
| 2021/0156124 A1 | 5/2021 | Yaghi et al. | |
| 2021/0237535 A1 | 8/2021 | Goel et al. | |
| 2021/0283528 A1 | 9/2021 | Pokorny et al. | |
| 2021/0283574 A1 | 9/2021 | Yaghi et al. | |
| 2022/0001328 A1 | 1/2022 | Yoon et al. | |
| 2022/0106203 A1 | 4/2022 | Marchon et al. | |
| 2022/0170247 A1 | 6/2022 | Yaghi et al. | |
| 2022/0389691 A1 | 12/2022 | Kuo et al. | |
| 2023/0063572 A1 | 3/2023 | Kapustin | |
| 2023/0264138 A1 | 8/2023 | McGrail et al. | |

FOREIGN PATENT DOCUMENTS

| | | | |
|---|---|---|---|
| CN | 106029674 A | 10/2016 | |
| CN | 1077722290 A | 2/2018 | |
| CN | 114182784 A | 3/2022 | |
| EP | 2507247 A1 | 10/2012 | |
| EP | 3721971 A1 | 10/2020 | |
| GB | 2540798 A | 2/2017 | |
| JP | S63-107720 A | 5/1988 | |
| JP | 2013-512223 A | 4/2013 | |
| JP | 2017-509607 A | 4/2017 | |
| JP | 2018080146 A | 5/2018 | |
| WO | WO 03/097216 A1 | 11/2003 | |
| WO | WO 2015/127033 A1 | 8/2015 | |
| WO | WO2016/186454 A1 | 11/2016 | |
| WO | WO 2018/118377 A1 | 6/2018 | |
| WO | WO-2018230430 A1 * | 12/2018 | ............. F24F 13/22 |
| WO | WO 2019/010102 A1 | 1/2019 | |
| WO | WO 2019/058158 A1 | 3/2019 | |
| WO | WO 2019/082000 A1 | 5/2019 | |
| WO | WO 2019/152962 A2 | 8/2019 | |
| WO | WO 2020/036905 A1 | 2/2020 | |
| WO | WO 2020/099561 A1 | 5/2020 | |
| WO | WO 2020/112899 A1 | 6/2020 | |
| WO | WO 2020/154427 A1 | 7/2020 | |
| WO | WO 2021/034477 A1 | 2/2021 | |
| WO | WO 2021/067179 A1 | 4/2021 | |
| WO | WO 2021/162894 A1 | 8/2021 | |
| WO | WO 2023/146800 A1 | 8/2023 | |
| WO | WO 2023/181058 A1 | 9/2023 | |

OTHER PUBLICATIONS

Kalmutzki et al. Metal-Organic Frameworks for Water Harvesting from Air; Adv. Mater. Sep. 2018, 30(37) 1704304.

Furukawa et al. Water Adsorption in Porous Metal-Organic Frameworks and Related Materials. J. Am. Chem. Soc., Mar. 2014, 136, 11, 4369-4381.

PCT International Patent Application No. PCT/US20/53052, International Search Report and Written Opinion of the International Searching Authority dated Jan. 4, 2021, 10 pages.

Tu et al. Progress and Expectation of Atmospheric Water Harvesting. Joule, Aug. 2018, vol. 2, Issue 8(15), pp. 1452-1478.

PCT International Patent Application No. PCT/US19/63442, International Search Report and Written Opinion of the International Searching Authority dated Jan. 22, 2020, 7 pages.

PCT International Patent Application No. PCT/US20/14647, International Search Report and Written Opinion of the International Searching Authority dated May 5, 2020, 11 pages.

PCT International Patent Application No. PCT/US21/16261, International Search Report and Written Opinion of the International Searching Authority dated Apr. 16, 2021, 8 pages.

PCT International Patent Application No. PCT/US21/47491, International Search Report and Written Opinion of the International Searching Authority dated Dec. 7, 2021, 9 pages.

PCT International Patent Application No. PCT/US22/12990, International Search Report and Written Opinion of the International Searching Authority dated Apr. 7, 2021, 14 pages.

PCT International Patent Application No. PCT/US22/26153, International Search Report and Written Opinion of the International Searching Authority dated Jul. 28, 2022, 18 pages.

Ding et al. Carbon capture and conversion using metal-organic frameworks and MOF-based materials. Chem. Soc. Rev., May 2019, 48(2):2783-2828.

Fracaroli et al. Metal-Organic Frameworks with Precisely Designed Interior for Carbon Dioxide Capture in the Presence of Water. Am. Chem. Soc., Jun. 2014, 136, pp. 8863-8866.

(56) References Cited

OTHER PUBLICATIONS

Hanikel et al. Rapid Cycling and Exceptional Yield in a Metal-Organic Frameworks for Water Harvester. ACS Cent. Sci., Aug. 2019, 5(10):1699-1706.
Kim et al. Water harvesting from air with metal-organic frameworks powered by natural sunlight. Science, Apr. 2017, 356:430-434.
Kummer et al. A functional full-scale heat exchanger coated with aluminum fumarate metal-organic framework for adsorption heat transformation. Ind. Eng. Chem. Res., Jul. 2017, 56(29):8393-8398.
Li et al. Incorporation of Alkylamine into Metal-Organic Frameworks through a Brønsted Acid-Base Reaction for CO2 Capture. ChemSusChem., Oct. 2016, 9(19):2832-2840.
Zhou et al. Atmospheric Water Harvesting: A Review of Material and Structural Designs. ACS Materials Lett., May 2020, 2(7):671-684.
Canivet et al. Water adsorption in MOFs: fundamentals and applications. Chem. Soc. Rev., Aug. 2014, 43(16):5594-5617.
Clus et al. Study of dew water collection in humid tropical islands. Hydrol., Oct. 2008, 361(1-2):159-171.
Fathieh et al. Practical water production from desert air. Sci. Adv., Jun. 2018, 4(6):eaat3198.
Klemm et al. Fog as a Fresh-Water Resource: Overview and Perspectives. Ambio, May 2012, 41(3):221-234.
Lee et al. Water harvest via dewing. Langmuir, Jun. 2012, 28(27):10183-10191.
Muselli et al. Dew water collector for potable water in Ajaccio (Corsica Island, France). Atmos. Res., Sep. 2002,64,297-312.
Park et al. Optimal Design of Permeable Fiber Network Structures for Fog Harvesting. Langmuir, Oct. 2013, 29(43):13269-13277.
Schemenauer et al. A Proposed Standard Fog Collector for Use in High-Elevation Regions. Appl. Meteorol., Nov. 1994, 33(11):1313-1322.
Wahlgren. Atmospheric Water Vapour Processor Designs for Potable Water Production: A Review. Water Res., Jan. 2001, 35(1):1-22.
Janiak et al. Solid-Solution Mixed-Linker Synthesis of Isoreticular A1-Based MOFs for and Easy Hydrophilicity Tuning in Water-Sorption Heat Transformations. Chem. Mater., May 2019, 31, 11, 4051-4062.
Fang et al. One-Pot Synthesis of Two-Linker Mixed A1-Based Metal-Organic Frameworks for Modulated Water Vapor Adsorption. Cryst. Growth Des., Aug. 2020, 20, 10, 6565-6572.
Global Cooling Prize. Transaera and partner Haier. Website, https://globalcoolingprize.org/transaera-inc/, originally downloaded Nov. 21, 2022, 3 pages.
PCT International Patent Application No. PCT/US23/33098, International Search Report and Written Opinion of the International Searching Authority dated Nov. 30, 2023, 11 pages.
U.S. Appl. No. 17/424,147, Office Action mailed Oct. 2, 2023.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. 1/2021/551201, Substantive Examination Report dated Sep. 6, 2023, 6 pages.
PCT International Patent Application No. PCT/US22/41142, International Search Report and Written Opinion of the International Searching Authority dated Jan. 20, 2023, 12 pages.
Gleick. Water in Crisis: A Guide to the World's Fresh Water Resources. Chapter 2, pp. 13-24. Aug. 1993, Oxford University Press, New York, USA.
PCT International Patent Application No. PCT/IN23/50258, International Search Report and Written Opinion of the International Searching Authority dated Jul. 4, 2023, 10 pages.
Japanese Patent Application No. 2021-529709, Office Action dated Nov. 21, 2023, 6 pages.
U.S. Appl. No. 18/384,992, Office Action mailed Jan. 23, 2024.
U.S. Appl. No. 18/077,417, Office Action mailed Jan. 17, 2024.
U.S. Appl. No. 18/077,417, Office Action mailed Mar. 29, 2024.
U.S. Appl. No. 18/371,700, Office Action mailed Apr. 18, 2024.
PCT International Patent Application No. PCT/US23/33101, International Search Report and Written Opinion of the International Searching Authority dated Feb. 8, 2024, 16 pages.

\* cited by examiner

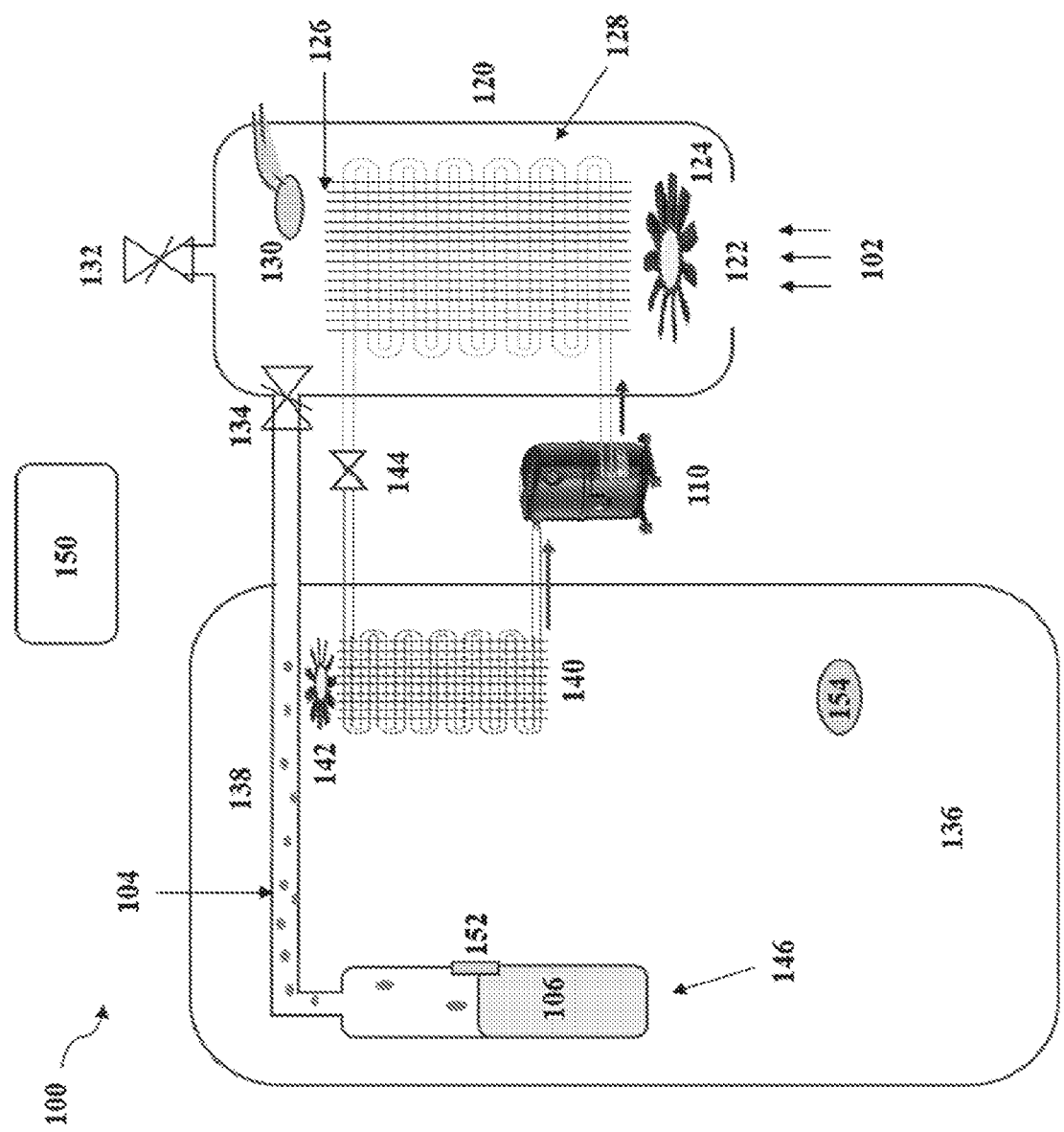

REFRIGERATOR INTEGRATED WITH AN ATMOSPHERIC WATER HARVESTING UNIT, AND METHODS OF USING THEREOF

CROSS-REFERENCE TO RELATED APPLICATION

This application is the United States National Stage of International Patent Cooperation Treaty Patent Application No. PCT/US20/53052, filed Sep. 28, 2020, which claims the benefit of U.S. Provisional Patent Application No. 62/908,171, filed Sep. 30, 2019, each hereby incorporated by reference herein.

FIELD

The present disclosure relates generally to refrigerators, and more specifically to refrigerators integrated with an atmospheric water harvesting unit.

BACKGROUND

Most refrigerators today are equipped with water dispensing capability. However, this requires a connection to water-supply piping. In areas where households do not have a ready-to-connect water supply line at the refrigerator installation site, a plumber typically needs to install a connection to a water supply, which can be costly. Moreover, there are certain areas of the world in which water supply is not readily accessible. The refrigerator also needs to have excessive tubing to guide pressurized tap water to the dispenser, which may lead to leaks. The water flow rate and pressure also need to be adjusted. These requirements add in complexity and reliability concerns during the life of the refrigerator.

Thus, what is needed in the art is a refrigerator designed to dispense water without need to connect to a water supply.

BRIEF SUMMARY

Provided herein is a refrigerator designed to harvest water from the atmosphere as the water supply.

In some aspects, provided is refrigerator system that includes: an atmospheric water harvesting unit, a compressor, an expansion valve, a cooling unit, a water condensing unit, a water tank, and a control system. In some embodiments, the system is configured to cycle through a moisture collection mode, a water production mode, and a cooling mode. In some variations, the atmospheric water harvesting unit includes a plurality of plates, in which each plate is independently coated on one or both sides with water capture material. The water capture material adsorbs moisture from surrounding air in the moisture collection mode, and desorbs water in the form of water vapor in the water production mode. The atmospheric water harvesting unit further includes a condenser. The compressor is configured to produce heated refrigerant, which is circulated to the condenser and heats up at least a portion of the plates, thereby causing desorption of water from at least a portion of the moisture sequestered in the water capture material in the water production mode. The expansion valve is configured to receive the refrigerant from the condenser, and allow adiabatic expansion of the refrigerant to produce a cooled refrigerant, which cools the interior of the refrigerator system in the cooling mode. The water condensing unit is configured to condense the desorbed water vapor into liquid water in the water production mode. The water tank is configured to store the liquid water. The control system is configured to shift the system from one mode to another.

In other aspects, provided is a refrigerator system, configured to cycle through a moisture collection mode, a water production mode, a cooling mode, and a standby mode. The system includes an atmospheric water harvesting unit; an air inlet configured to bring surrounding air into the atmospheric water harvesting unit; a condenser positioned in proximity to the plurality of plates; a condenser fan positioned in between the air inlet and the plurality of plates; an exhaust valve: and a steam valve. The system further includes a cooling unit, which is made of at least an evaporator and an evaporator fan; a water condensing unit; a water tank; a compressor; an expansion valve, connected to the evaporator and the condenser; and a control system. In some variations, the control system includes a plurality of sensors, such as a humidity sensor to detect moisture saturation of the water capture material; a temperature sensor to detect temperature of the refrigerator system interior; and a water volume sensor to detect water level in the water tank. The control system is configured to shift the system from one mode to another.

When the system is in the moisture collection mode, the compressor is off; the steam valve is closed; the exhaust valve is open; and the condenser fan is configured to draw surrounding air into the atmospheric water harvesting unit through the air inlet and blow the surrounding air through the gap between adjacent plates, thereby causing the water capture material to adsorb moisture from the surrounding air.

When the system is in the water production mode, the steam valve is open; the exhaust valve is closed; the compressor is on and configured to compress refrigerant, thereby producing a heated refrigerant; the condenser is configured to receive the heated refrigerant from the compressor and heat up at least a portion of the plates, thereby causing desorption of at least a portion of moisture sequestered in the water capture material, and the condenser fan is configured to push desorbed water vapor through the steam valve into the water condensing unit, wherein the water vapor condenses into liquid water that is stored in the water tank.

When the system is in the cooling mode, the steam valve is closed; the exhaust valve is open; the compressor remains on; the expansion valve is configured to receive the refrigerant from the condenser, and allow adiabatic expansion of the refrigerant, thereby producing a cooled refrigerant; the evaporator is configured to receive the cooled refrigerant; and the evaporator fan is configured to cool the interior of the refrigerator system. In some variations, the compressor and the expansion valve are configured to compress/expand the refrigerant in one or more continuous cycles until the refrigerator system interior exceeds a threshold temperature.

When the system is in the standby mode, the steam valve is closed; the exhaust valve is open; the compressor is off; and the condenser fan is off.

In some embodiments, the control system is configured to shift the system to the moisture collection mode when the water level in the water tank is detected by the water volume sensor to drop below a threshold water level; the water production mode when the moisture saturation level is detected by the humidity sensor to exceed a threshold moisture saturation level; the cooling mode when the temperature of the refrigerator system interior is detected by the temperature sensor to exceed a threshold temperature: and the standby mode when the temperature of the refrigerator system interior is detected by the temperature sensor to drop below a threshold temperature, and the water level in the water tank is detected by the water volume sensor to exceed a threshold water level.

In other aspects, provided is a method of operating the refrigerator systems described herein that source water, at least in part, from an atmospheric water harvesting unit by atmospheric water harvesting. In some embodiments, the method includes: a) directing surrounding air into the atmospheric water harvesting unit, wherein at least a portion of the water capture material adsorbs moisture from the surrounding air; b) compressing refrigerant in the compressor to produce a heated refrigerant; c) heating at least a portion of the plates as the condenser cools heated refrigerant received from the compressor, wherein at least a portion of moisture sequestered in the water capture material is desorbed in the form of water vapor; d) condensing the desorbed water vapor in the water condensing unit to produce liquid water; e) storing the liquid water in the water tank; f) adiabatically expanding the refrigerant received from the condenser in the expansion valve to produce cooled refrigerant; and g) cooling the refrigerator system interior as the cooling unit receives cooled refrigerant from the expansion valve. With respect to the method described above, step (a) is performed when the system is in moisture collection mode; steps (b) and (d) are performed when the system is in water collection mode; and steps (f) and (g) are performed when the system is in cooling mode.

In certain aspects, the method includes: a) directing surrounding air into the atmospheric water harvesting unit, wherein at least a portion of the water capture material adsorbs water from the surrounding air; h) shifting the system from moisture collection mode to water production mode when the moisture saturation level of the water capture material in the atmospheric water harvesting unit exceeds a threshold moisture saturation level; c) compressing refrigerant to produce a heated refrigerant in the water production mode; d) cooling the heated refrigerant to room temperature in the condenser in the water production mode, thereby heating up at least a portion of the plates and causing desorption of at least a portion of water sequestered in the water capture material; e) transferring the desorbed water vapor into the water condensing unit in the water production mode; f) condensing the desorbed water vapor into liquid water in the water production mode; g) storing the liquid water in the water tank; h) shifting the system from water production mode to cooling mode when the temperature of the refrigerator system interior exceeds a threshold temperature; i) adiabatically expanding the refrigerant received from the condenser using an expansion valve in the cooling mode, thereby producing a cooled refrigerant; j) circulating the cooled refrigerant to an evaporator in the cooling mode; k) cooling the refrigerator system interior using an evaporator fan positioned near the evaporator in the cooling mode; and l) compressing and expanding the refrigerant through one or more continuous cycles in the cooling mode.

DESCRIPTION OF THE FIGURES

The present application can be best understood by reference to the following description taken in conjunction with the accompanying figures included in the specification.

FIG. 1 depicts an exemplary refrigerator system with an integrated atmospheric water harvesting unit.

DETAILED DESCRIPTION

The following description sets forth exemplary methods, parameters and the like. It should be recognized, however, that such description is not intended as a limitation on the scope of the present disclosure but is instead provided as a description of exemplary embodiments.

In some aspects, provided herein are refrigerator systems designed to incorporate atmospheric water capture to supply clean drinking water, without the need to connect to an external water supply. In some embodiments, commercially available refrigerators are retrofitted to add an atmospheric water harvesting unit. In other embodiments, refrigerators have a built-in atmospheric water harvesting unit. Such refrigerator systems do not require the installation of a connection to a water supply, as water is captured from surrounding air.

Moreover, such refrigerator systems can be used in areas of the world that have limited water supply and/or have the driest environments. For example, in some variations, areas with dry environments have a relatively humidity of less than about 30%, less than about 20%, less than about 15%, less than about 10%, less than about 5%, or less than about 1%; or between about 1% and about 20%, between about 1% and about 15%, or between about 10% and about 20%.

With reference to FIG. 1, system 100 is an exemplary refrigerator system with integrated atmospheric water harvesting unit 120. To a certain extent, system 100 operates like conventional refrigerators. Compressor 110 compresses refrigerant, which heats the refrigerant. In some variations, the refrigerant heats up to temperatures in the 60° C. to 70° C. range. The refrigerant is cooled to room temperature in condenser 128 using condenser fan 122. Heat exchange is facilitated by the use of plates 126, offering a large surface area. The refrigerant is then allowed to adiabatically expand in expansion valve 144, leading to a large drop in temperature. The cold refrigerant enters the refrigerator in evaporator 140, where evaporator fan 142 helps cool the refrigerator interior. The refrigerant then re-enters compressor 110, and the compression/expansion cycle continues to proceed until the refrigerator reaches a threshold temperature. However, unlike convention refrigerators, system 100 includes atmospheric water harvesting unit 120, which is an enclosed unit housing plates 126 coated with water capture material.

In standby mode, system 100 does not need cooling or water production, and compressor 110 and all fans (condenser fan 124 and evaporator fan 142) are turned off.

When water needs to be collected, system 100 goes into moisture collection mode, and condensor fan 124 is turned on, allowing air 102 to flow between plates 126. Moisture from the surrounding air is adsorbed by the water capture material. In the moisture collection mode, exhaust valve 132 is open, and steam valve 134 is closed. Humidity sensor 130 is positioned near exhaust valve 132, is used to turn condenser fan 122 off after the water capture material is saturated with moisture, when the humidity there approaches ambient levels. In some variations, condenser fan 122 can be adjusted to minimize noise and energy demand, while at the same time maximizing water production.

When the humidity in the atmospheric water harvesting unit approaches ambient levels, system 100 then enters into water production mode, with compressor 110 turned on, condensor 128 heating up, and water from the water capture material starting to desorb. In some variations, condenser fan 122 is allowed to run at low speed, while exhaust valve 132 closes and the steam valve 134 opens up. Moist air 104 therefore is allowed to enter the inside of the cold refrigerator through water condensing unit 138, and liquid water slowly condenses, in some variations, a gentle slope in the water condensing unit 138 may allow liquid water 106 to transfer into water tank 146. Liquid water 106 provides clean water to the cold water outlet and refrigerator ice maker.

Once all the water has desorbed from the water capture material, as monitored by humidity sensor 130, system 100 goes back to either standby mode or cooling mode (if the refrigerator needs cooling). In cooling mode, steam valve 134 closes, exhaust valve 132 opens, and condenser fan 124 is turned on to full speed, allowing compressor 110 to run in the conventional mode of a standard refrigerator.

A summary of the four modes and the state of certain components of the refrigerant system involved in water capture is provided in Table 1 below.

TABLE 1

|  | Standby Mode | Moisture Collection Mode | Water Production Mode | Cooling Mode |
| --- | --- | --- | --- | --- |
| Water Capture State | n/a | Adsorption | Desorption | n/a |
| Compressor | Off | Off | On | On |
| Condenser Fan | Off | Variable | Low | High |
| Steam Valve | Closed | Closed | Open | Closed |
| Exhaust Valve | Open | Open | Closed | Open |

System 100 further includes control system 150, which is connected to humidity sensor 130, temperature sensor 154, and water level sensor 152. Temperature sensor 154 monitors the temperature of refrigerator interior 136, making sure system 100 enters the cooling mode from standby mode when temperature T inside the refrigerator exceeds a given threshold $T_{th}$. Water level sensor 152 monitors the water collection volume Vol in water tank 146, and when Vol dips below a given threshold $Vol_{th}$ system 100 shifts into moisture collection mode and water production product. A summary of the control system architecture for water production and refrigeration is provided in Table 2 below.

TABLE 2

|  | $Vol > Vol_{th}$ | $Vol < Vol_{th}$ |
| --- | --- | --- |
| $T > T_{th}$ | Cooling Mode | Moisture Collection Mode<br>Water Production Mode<br>Cooling Mode |
| $T < T_{th}$ | Standby Mode | Moisture Collection Mode<br>Water Production Mode |

Various components of the refrigerator systems and methods of using such systems are described further detail below.

Plates

In some embodiments, the atmospheric water harvesting unit includes plates, which are each independently coated on one or both sides with the water capture material. In some variations, the plates are arranged parallel to each other and a gap exists between adjacent plates. The plates may be made of any suitable material, including any suitable metal. For example, in some variations, the plates comprise aluminum. In some variations, the plates comprise solid metal. In one variation, the plates are in the shape of fins.

In certain variations, the plates have a flat surface. In other variations, each plate has a cellular design where its surface is crisscrossed with small channels in a grid pattern, so as to make water capture material areas (e.g., squares) that would allow for thermal expansion mismatch between the plates and the water capture material. In other variations, each plate has a surface textured with topographic features that can enhance water adsorption/desorption performance and/or reliability. In one variation, the topographic features are holes, bumps, ridges, or grooves, or any combination thereof. In another variation, the plates include mesh. For example, in one variation, the plates include aluminum mesh.

In some embodiments, the distance of the gap between adjacent plates relative to the length of each plate achieves optimal air flow and maximizes water adsorption. In some variations the gap between adjacent plates is about 1% to about 5% of the length of a plate.

In some embodiments, the plates are coated with layers of the water capture material each having a thickness between about 10 microns to about 500 microns, or between about 50 microns to 500 microns, or between about 10 microns to about 50 microns. The thickness of the layer may allow for faster adsorption and desorption (e.g., as compared to thicker layers). In other embodiments, the plates are coated with layers of the water capture material each having a thickness of about 0.1 to about 1 cm. Such thickness of the layer may allow for production of larger water quantities (e.g., as compared to thinner layers).

In certain embodiments, each layer of the water capture material on the plates has a porosity. In some variations, the porosity is at least about 40%, at least about 50%, at least about 60%, at least about 70%, or at least about 80%: or between about 40% and about 90%, between about 50% and 90%, between about 40% and about 80%, between about 50% and about 80%, or between about 60% and about 80%. In other embodiments, the layer of the water capture material is non-porous.

In some embodiments, the ratio of the thickness of the layer of the water capture material is greater than the thickness of a plate. In certain embodiments where both sides of the plates are coated with the water capture material, the ratio of the thickness of the first (e.g., top) layer of the water capture material to the thickness of the plate to the thickness of the second (e.g., bottom) layer of the water capture material optimizes desorption of water and energy used to heat the plates in the chamber. In some variations, where the layers are non-porous, the thickness of each layer of the water capture material may be at least greater than half of the plate thickness.

In some variations of the foregoing, the layers of the water capture material may be mixed with one or more additional components. In some variations, a hinder may be mixed into the layer. In certain variations, silicone hinder may be used. In one variation, a silicone resin binder may be used. In certain variations, the layer may further comprise one or more materials to help with thermal conductivity, to speed up transfer. In one variation, the layer further comprises graphite.

In certain variations, the water capture material is uniformly distributed on the plates. Any suitable techniques known in the art may be employed to coat the layers of the water capture material on the plates. For example, in one variation, the layers of water capture material are deposited onto the plates.

Water Capture Material

In some embodiments, the water capture material can selectively capture water from the atmosphere.

In some variations, the water capture material on the plates comprises metal organic frameworks (MOFs). MOFs are porous materials that have repeating secondary building units (SBUs) connected to organic ligands. In some variations, the SBUs may include one or more metals or metal-containing complexes. In other variations, the organic ligands have acid and/or amine functional group(s). In certain variations, the organic ligands have carboxylic acid groups.

Any suitable MOFs capable of adsorbing and desorbing water may be employed in the systems provided herein. Suitable MOFs may include those described in, for example, Kalmutzki et al., Adv. Mat., 30(37), 1704304 (2018); Furukawa et al., J. Am. Chem. Soc. 2014, 136, 4369-4381; Y. Tu et. al., Joule, Vol 2, Issue 8(15), 1452-1475 (2018).

In some variations, the water capture material comprises:
- MOF-303: Al(OH)(HPDC), where HPDC is 1H-pyrazole-3,5-dicarboxylate;
- CAU-10: Al(OH)(IPA), where IPA is isophthalate;
- MOF-801: $Zr_6O_4(OH)_4(fumarate)_6$;
- MOF-841: $Zr_6O_4(OH)_4(MTB)_6(HCOO)_4(H_2O)_2$;
- Aluminum Fumarate: Al(OH)(fumarate);
- MIL-160: Al(OH)(FDA), where FDA is 2,5-furandicarboxylate;
- MIL-53: Al(OH)(TPA), where TPA is terephthalate; or
- Aluminum Phosphate: AlPO4-LTA, or any combination thereof.

In some variations, the MOFs have pore sizes between about 0.5 nm about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have 1D channels that allow for reversible water adsorption.

In some variations, the water capture material is a microporous aluminum phosphate ($AlPO_4$-LTA). See e.g., Y. Tu et. al., Joule, Volt, Issue 8(15), 1452-1475 (2018).

In other variations, the water capture material is a desiccant material. Any suitable desiccant material may be used.

Any combinations of the water capture materials described herein may also be used.

Condenser

In some embodiments, the atmospheric water harvesting unit includes one or more condensers. The condenser is positioned in proximity to the plates with water capture material. In some variations, multiple condensers are used. In one variation where multiple condensers are used, the condensers are serially arranged.

In some embodiments, when the system is in the water production mode, the condenser receives heated refrigerant from the compressor, and heats up at least a portion of the plates, thereby causing desorption of at least a portion of moisture sequestered in the water capture material.

Condenser Fan

In some embodiments, the atmospheric water harvesting unit includes one or more condenser fans. The condenser fan is positioned in between the air inlet of the atmospheric water harvesting unit and the plates with water capture material. In some variations, multiple condenser fans are used. In one variation where multiple condenser fans are used, the condenser fans are serially arranged.

In some embodiments, when the system is in moisture collection mode, the condenser fan draws surrounding air into the atmospheric water harvesting unit through the air inlet and blows the surrounding air through the gap between adjacent plates, thereby causing the water capture material to adsorb moisture from the surrounding air.

In some embodiments, when the system is in water production mode, the condenser fan pushes desorbed water vapor through the steam valve into the water condensing unit, wherein the water vapor condenses into liquid water that is stored in the water tank.

Exhaust and Steam Valves

In some embodiments, the atmospheric water harvesting unit includes one or more exhaust valves and one or more steam valves. The valve configurations as the refrigerator system cycles through the various modes is summarized in Table 1 above.

In some variations, the atmospheric water harvesting unit has one exhaust valve, or a plurality of exhaust valves. In some variations, the atmospheric water harvesting unit has one steam valve, or a plurality of steam valves.

Compressor

In some embodiments, the system further includes one or more compressors. Any compressors typically found in standard refrigerators may be employed in the systems of the present invention. In some variations, multiple compressors are used. In one variation where multiple compressors are used, the compressors are serially arranged.

The compressor compresses refrigerant that circulates in the refrigerator system, which heats the refrigerant. In some variations, the refrigerant heats up to temperatures in the 60° C. to 70° C. range. The heated refrigerant is circulated to the condenser in the atmospheric water harvesting unit, as discussed above.

Expansion Value

In some embodiments, the system further includes one or more expansion valves. Any expansion valves typically found in standard refrigerators may be employed in the systems of the present invention. In some variations, multiple expansion valves are used. In one variation where multiple expansion valves are used, the expansion valves are serially arranged.

In some embodiments, when the system is in the cooling mode, the expansion valve receives the refrigerant from the condenser, and allows adiabatic expansion of the refrigerant, thereby producing a cooled refrigerant. The cooled refrigerant is circulated to the evaporator, as discussed below.

Evaporator and Evaporator Fan

In some embodiments, the refrigerator system includes one or more cooling units that houses one or more evaporators and one or more evaporator fan.

Any evaporators typically found in standard refrigerators may be employed in the systems of the present invention. In some variations, multiple evaporators are used. In one variation where multiple evaporators are used, the evaporators are serially arranged.

Any evaporator fans typically found in standard refrigerators may be employed in the systems of the present invention. In some variations, multiple evaporator fans are used. In one variation where multiple evaporator fans are used, the evaporator fans are serially arranged.

In some embodiments, when the system is in the cooling mode, the evaporator receives the cooled refrigerant, and evaporator fan helps to cool the refrigerator system interior.

The refrigerant then re-enters the compressor, and the compression/expansion cycle continues to proceed until the refrigerator reaches a threshold temperature.

Water Condensing Unit

In some embodiments, the refrigerator system further includes one or more water condensing units that condenses the steam that is produced during the water production mode, and directed in into the water tank.

In certain embodiments, the water condensing unit has any suitable shape for maximizing water condenstion. For instance, in some variations, the water condensing unit may be shaped into a downward spiral to enhance thermal equilibrium with the inside of the refrigerator system. In certain variations, the water condensing unit may also be equipped with heat-exchange structures, such as fins, spikes, or other types of protuberances.

Water Tank

In some embodiments, the refrigerator system further includes one or more water tanks that hold the liquid water that condenses in the system. In some variations, the liquid water stored in the water tank is dispensed as drinking water. In other variations, the liquid water stored in the water tank is dispensed as ice cubes produced from the liquid water in the water tank.

In certain embodiments where water in the refrigerator is supplied from an external water supply in combination with the atmospheric water harvesting unit, the liquid water produced from the atmospheric water harvesting unit feeds into the same water tank connected to the external water supply.

Control System

In some embodiments, the systems include a control system that monitors and controls the cycling among the various modes of the system, including standby mode, moisture collection mode, water production mode, and cooling mode. With respect to atmospheric water harvesting, the control system monitors and controls adsorption, desorption and condensation. In some variations, the control system includes at least one processor unit and sensors.

In some variations, the processor unit controls and shifts the system into the various modes and process steps. In certain variations, the control system can adjust run conditions based on readings of the refrigerator system interior and/or the environment.

In some variations, the sensors of the control system include one or more humidity sensors, one or more temperature sensors, and one or more water volume sensors. In certain variations, the humidity sensor is positioned within the atmospheric water harvesting unit, and detect moisture saturation of the water capture material. When the moisture saturation level is detected by the humidity sensor to exceed a threshold moisture saturation level, the system shifts to the water production mode. In certain variations, the temperature sensor detect temperature of the refrigerator system interior. When the temperature of the refrigerator system interior is detected by the temperature sensor to exceed a threshold temperature, the system shifts to the cooling mode. In certain variations, the water volume sensor is integrated with the water tank. When the water level in the water tank drops is detected by the water volume sensor to drop below a threshold water level, the system shifts to the moisture collection mode. When the temperature of the refrigerator system interior is detected by the temperature sensor to drop below a threshold temperature, and the water level in the water tank is detected by the water volume sensor to exceed a threshold water level, the system shifts to standby mode.

Power Sources

In some variations, the refrigerator systems provided herein further include one or more solar power source(s). In certain variations, the systems further include photovoltaic (PV) cells or passive solar captors, or a combination thereof. In other variations, the exemplary systems provided herein may be partially or fully powered by electricity.

What is claimed is:

1. A refrigerator system, configured to cycle through a moisture collection mode, a water production mode, and a cooling mode, wherein the system comprises:
an atmospheric water harvesting unit, comprising:
a plurality of plates, wherein each of the plurality of plates is independently coated on one or both sides with water capture material, and wherein the water capture material adsorbs moisture from surrounding air in the moisture collection mode, and desorbs water in the form of water vapor in the water production mode; and
a condenser;
a compressor, configured to produce heated refrigerant, wherein the heated refrigerant is circulated to the condenser and heats up at least a portion of the plates, thereby causing desorption of water from at least a portion of the moisture sequestered in the water capture material in the water production mode;
an expansion valve, configured to receive the refrigerant from the condenser, and allow adiabatic expansion of the refrigerant to produce a cooled refrigerant, wherein the cooled refrigerant cools the interior of the system in the cooling mode;
a water condenser, configured to condense the desorbed water vapor into liquid water in the water production mode;
a water tank, configured to store the liquid water; and
a control system configured to shift the system from one mode to another.

2. The system of claim 1, wherein the water capture material comprises metal organic framework.

3. The system of claim 1, wherein the water capture material comprises a desiccant material.

4. The system of claim 1, wherein each of the plurality of plates comprises a metal plate.

5. The system of claim 4, wherein the metal plate comprises aluminum.

6. The system of claim 1, wherein each coating of water capture material on a cooling fin has an average thickness of about 50 micrometers to about 500 micrometers.

7. The system of claim 1, wherein each plate has a surface textured with topographic features.

8. The system of claim 7, wherein the topographic features are holes, bumps, ridges, or grooves, or any combination thereof.

9. The system of claim 1, further comprising a gap between adjacent plates, wherein the distance of the gap relative to a length of each plate achieves optimal air flow and maximizes water adsorption.

10. The system of claim 1, wherein both sides of each of the plurality of plates is coated with the at least one water capture material.

11. The system of claim 1, wherein the water capture material has a thickness and each of the plurality of plates has a thickness, and wherein the ratio of the thickness of the water capture material to the thickness of the plate optimizes desorption of water and energy used to heat the plurality of the plates.

12. The system of claim 9, further comprising a condenser fan configured to blow air having a laminar flow through the gap between adjacent plates.

13. The system of claim 1, wherein the compressor is configured to compress and heat the refrigerant to a temperature of at least 50° C.

14. The system of claim 13, wherein the temperature occurs in a range of about 60° C. to about 70° C.

15. The system of claim 1, the system is configured to (i) dispense the liquid water in the water tank as drinking water; or (ii) dispense ice cubes produced from the liquid water in the water tank, or a combination of (i) and (ii).

* * * * *